United States Patent [19]

Okuyama et al.

[11] Patent Number: 5,037,593
[45] Date of Patent: Aug. 6, 1991

[54] METHOD FOR FABRICATING CORE SLIDER FOR A MAGNETIC HEAD

[75] Inventors: Shinichi Okuyama; Kouji Yamazaki; Koichi Yaba; Kazuhiko Watanuki; Akio Kishimoto; Ken Toyoshima, all of Nagaoka; Akira Sato, Kanazawa, all of Japan

[73] Assignee: Alps Electric Co., Ltd., Tokyo

[21] Appl. No.: 355,217

[22] Filed: May 22, 1989

[30] Foreign Application Priority Data

Jun. 29, 1988 [JP] Japan ................................. 63-161868
Jul. 22, 1988 [JP] Japan ................................. 63-183279
Oct. 3, 1988 [JP] Japan ................................. 63-249411
Oct. 3, 1988 [JP] Japan ................................. 63-249413

[51] Int. Cl.$^5$ .............................................. C04B 35/26
[52] U.S. Cl. ........................................ 264/60; 264/66; 264/67

[58] Field of Search .............................. 264/60, 66, 67

[56] References Cited

U.S. PATENT DOCUMENTS 3,538,600 11/1970 Farrell et al. ........................ 264/67
4,093,688 6/1978 Withop et al. ........................ 264/66
4,327,387 4/1982 Plotto .
4,675,988 6/1987 Matsuzawa .

Primary Examiner—James Derrington
Attorney, Agent, or Firm—Guy W. Shoup; B. Noël Kivlin

[57] ABSTRACT

A core slider for a magnetic head is disclosed, in which occurrence of the grain detachment from the slider due to microcracks produced at the fabrication of the slider is reduced by forming a hematite thin film on the surface portion of the core slider.

3 Claims, 3 Drawing Sheets

METHOD FOR FABRICATING CORE SLIDER FOR A MAGNETIC HEAD

FIELD OF THE INVENTION

This invention relates to a method for fabricating a slider for a magnetic head adopted in floating type magnetic head for recording/reproducing information on a magnetic disc.

BACKGROUND OF THE INVENTION

Heretofore a monolithic floating type magnetic head for recording/reproducing information on a magnetic disc is widely used, in which sintered ferrite such as Mn—Zn ferrite, etc. is used for the head core and the slider.

A method for fabricating the monolithic type magnetic head will be briefly explained below. At first, a plate-shaped slider block and a head core block, whose cross-section is approximately U-shaped, are formed by cutting a material block made of sintered ferrite such as Mn—Zn ferrite, etc. by mechanical working. Then the head core block is joined on one side surface of the slider block by using glass. A plurality of head cores are formed by cutting the slider block having a predetermined core width with a predetermined interval along the joining surface therebetween. After that, a number of negative pressure grooves for increasing the floating power are formed on a surface of the slider block, which is opposite to a rigid disc, along the joining plane. Then a plurality of sliders are obtained by slicing the slider block in the direction perpendicular to the joining plane of each of the head cores by means of a whetstone of granulometry No. 400 to 800, after having finished the surface of the slider block so as to obtain a predetermined superficial roughness by subjecting it to lapping. A plurality of monolithic type magnetic heads are fabricated simultaneously by subjecting the surface of each of the sliders and the edges of the head core to chamfering working.

OBJECT OF THE INVENTION

The prior art magnetic head thus fabricated had a disadvantage that grains at the surface portion are apt to be detached, because the slider is fabricated, starting from sintered ferrite, whose starting material is powder, just as the head core. In the case where these detached grains are stuck on the magnetic disc serving as magnetic memory medium, so-called head crash, by which the magnetic layer at the surface of the disc is destroyed due to the fact that detached grains get in between the magnetic head and the magnetic disc, may be induced. The frequency of head crash occurrences increases with decreasing amount of floating of the magnetic head, resulting from narrowing of the track and high density recording. Therefore, it was strongly desired to solve this problem.

This invention has been done under such a background and the object thereof is to provide a method for fabricating a slider for a magnetic head capable of preventing the grain detachment from the surface portion of the slider.

SUMMARY OF THE INVENTION

In order to solve the problem described above, the inventors of this invention have performed various experiments for determining the probability the occurrence mechanism of the grain detachment from the surface portion of the slider. The inventors found that the grain detachment from the surface portion of the slider is caused by the fact that microcracks produced by cutting the starting material block are grown by remaining stress; that remarkable grain detachment occurs under high temperature and high humidity; and in particular in the case where there exists water at extremities of the microcracks, where the chemical reactivity is high, hydrolysis reaction takes place at these portions so that the growth of the microcracks is accelerated and occurrence of the grain detachment remarkably increases. Therefore, the inventors have considered that the grain detachment can be prevented by subjecting the slider block to heat treatment after working so as to eliminate the remaining stress and at the same time by oxidizing the surface portion of the slider so as to cover the slider by a hematite thin film so that the supply of water to the extremities of the microcracks is interrupted. Various kinds of experiments have been performed in order to search the optimum conditions and as the result it has been found that the occurrence of the grain detachment can be reduced significantly if the slider block is subjected to heat treatment in air for 5 to 50 hours in a temperature region from 250° to 350° C. That is, experiments on the resistance against high temperature and high humidity environments have been performed after having subjected slider blocks to heat treatment in air for 20 hours at various temperatures. As indicated in FIG. 2, alleviation of the remaining stress and the formation of the oxide (hematite) thin film are insufficient and thus the grain detachment occurrence rate is not reduced for a temperature region below 250° C. On the other hand, as indicated in FIG. 3, for a temperature region above 300° C., although the grain detachment occurrence rate is low, the separation of the hematite film increases so that the superficial resistivity $\rho$ increases, too. Further, for a temperature region above 350° C., permeability $\mu$ increases rapidly, which reduces the magnetism remarkably. Therefore, these regions are not suitable for the heat treatment temperature. In the case where the heat treatment temperature is held at 300° C. and the duration of the heat treatment is varied, as indicated in FIG. 4, it was found that for a heat treatment duration shorter than 5 hours the grain detachment occurrence rate does not decrease and that it is reduced almost to 0 for 50 hours. The grain detachment occurrence rate is so defined that it is 100%, when at least one grain is detached per 1 mm$^2$ of the surface of the slider. For example, the grain detachment occurrence rate is 80%, when 80 grains are detached from a slider having a surface area of 100 mm$^2$. In order that a slider can be used for a magnetic head, it is required that the grain detachment occurrence rate in the experiment on the resistance against high humidity is below 20% and in order to guarantee satisfactorily the reliability, it is desirable that it is below 5%.

In the case where such a heat treatment is incorporated in the fabrication process of the slider described above, taking deterioration in the superficial form due to the heat treatment is to account, the heat treatment should be effected before the finish of the surface of the slider by lapping. Consequently the heat treatment described above has no effect on the microcracks produced by the cutting processing of the slider block after the lapping and there remains a small probability of the grain detachment from the cutting surface.

Therefore, the inventors have studied a method for preventing the grain detachment from the cutting surface of the slider block and found that the generation of microcracks can be prevented if the superficial roughness, which has been finished so as to be pearl skin-like is improved, as indicated in FIG. 5, the grain detachment occurrence rate is below 10%, which is a practical limit, if the cutting surface of the slider block is finished so that the superficial roughness is below 1 μm. Rmax.

Thus the inventors have studied various working conditions satisfying this condition and found, as the result, that the cutting surface is finished in a minor surface, whose superficial roughness is below 1 μm.Rmax, and the occurrence of the grain detachment is suppressed by using a whetstone of granulometry of No. 100 to 300 as a cutting tool and setting the peripheral speed of the whetstone to a value between 3000 and 10000 m/min.

According to the fabrication method described above, the surface portion of the slider block is densely covered by a hematite thin film by effecting the heat treatment in the working process of the slider block and in this way penetration of water into the interior can be prevented, which suppresses hydrolysis reaction at extremities of the microcracks. Further, since the remaining stress is also removed by the heat treatment, the growth of the microcracks are further suppressed. The cutting surface of the slider block is finished so that the superficial roughness is below 1 μm. Rmax by cutting the slider block under the conditions described above and thus the occurrence of the grain detachment at the cutting surface is suppressed. In the manner described above, the grain detachment from the surface portion of the slider due to microcracks can be significantly reduced.

DETAILED DESCRIPTION

Hereinbelow is an embodiment, in which this invention is applied to the fabrication of a monolithic type magnetic head, referring to FIGS. 1A to 1G.

Figure 1A:
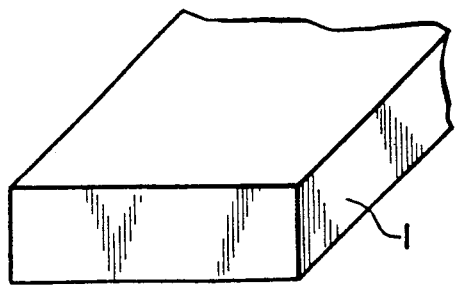
FIGS. 1A to 1G are perspective views showing fabrication steps of a monolithic type magnetic head in a first embodiment of this invention.

At first, the fabrication steps of the magnetic head in this embodiment will be explained in detail. As indicated in FIG. 1A, in the fabrication of the magnetic head of this embodiment, a plate-shaped material block 1 is used as starting material. This material block 1 is made of sintered ferrite. The fabrication process will be explained briefly. At first, powders of oxide, carbonate, etc. (e.g. $\alpha$-$Fe_2O_3$, $Mn_3O_4$, $MnCO_3$, $ZnO$) are weighted in the ratio of the molecular composition of ferrite. They are mechanically mixed and heated at a temperature of 900°~1200° C. In this way, following reactions take place to produce ferrite;

$$MnO + Fe_2O_3 \rightarrow MnFe_2O_4$$

$$ZnO + Fe_2O_3 \rightarrow ZnFe_2O_4$$

Then ferrite powder produced in this way is formed into a necessary shape and then piece made of sintered ferrite having the predetermined shape by sintering the powder formed and compressed so that a solid reaction takes place. Further, it is possible to obtain a high density ferrite piece by effecting hot static water press. In addition, the ferrite powder may be produced by liquid phase reaction and the formation by the hot press method and the sintering may be effected simultaneously.

Figure 1B:
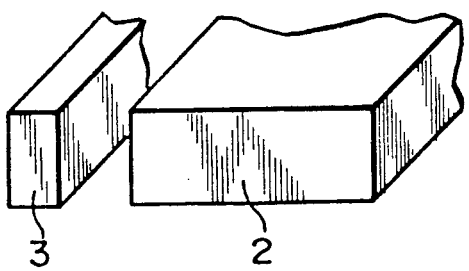
Figure 1C:
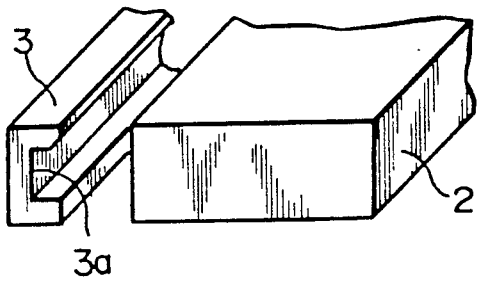
Figure 1D:
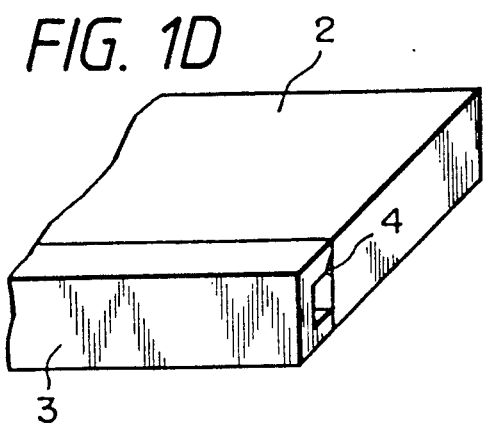

In order to fabricate magnetic heads from the material block 1 thus fabricated, at first the material block 1 is cut into a slider block 2 and a core block 3 by using a whetstone of granulometry No. 400~600, as indicated in FIG. 1B. Then, as indicated in FIG. 1C, a groove 3a is formed on the cutting surface of the core block 3. After that, the cutting surfaces of the slider block 2 and the core block 3 are polished and an $SiO_2$ layer for forming a gap is deposited thereon by sputtering. As indicated in FIG. 1D, the cutting surface of the core block 3 is made butt on the cutting surface of the slider block 2 and they are joined by using glass substance 4. This glass substance 4 is a sort of glass having a melting point much lower than that of usual glass substance (e.g. $SiO_2$, etc.), i.e. low melting point glass. The bonding temperature therefor is 300°~500° C.

Figure 1E:
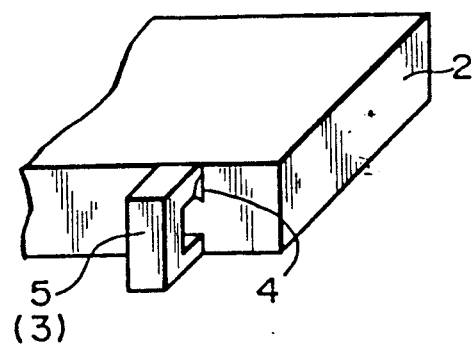
Figure 1F:
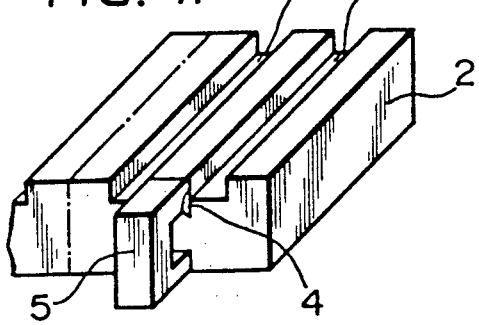

After having joined the slider block 2 with the core block 3, the upper and the lower surfaces thereof are polished, while holding them in one body so as to obtain a predetermined thickness. Then, as indicated in FIG. 1E, the core block 3 is processed to a predetermined width so as to form a head core 5. Thereafter, as indicated in FIG. 1F, negative pressure grooves 6 are formed on the upper surface of the slider block for floating the relevant magnetic head with respect to a rigid disc.

Figure 1G:
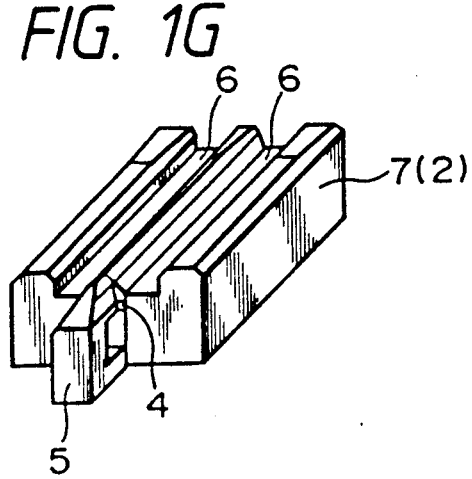
Figure 2:
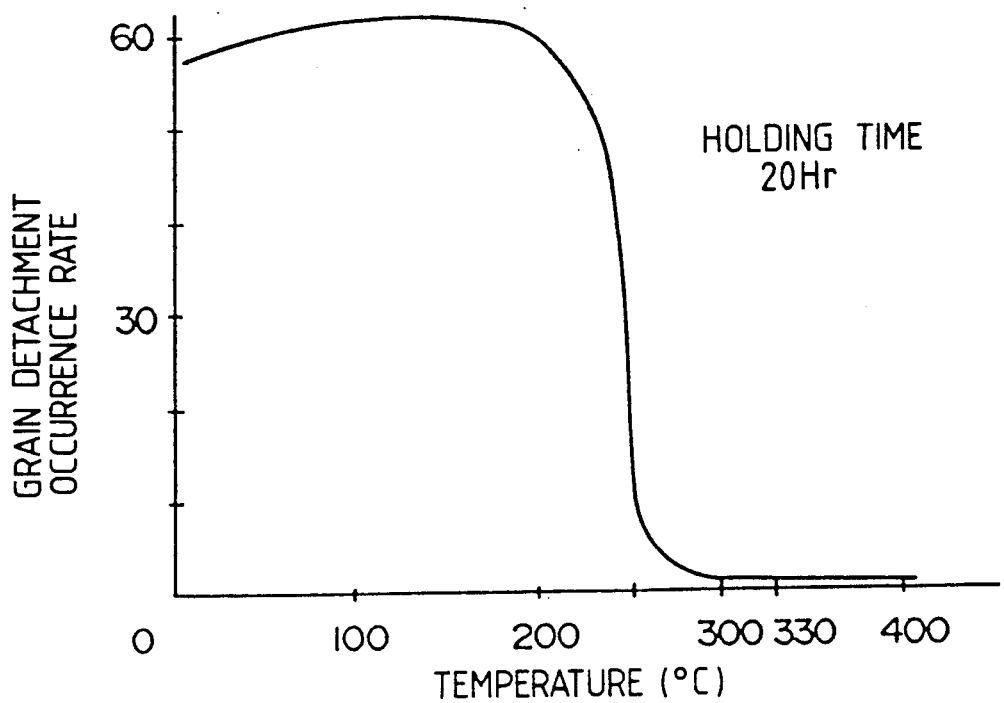
FIG. 2 is a graph showing the relationship between the slider heat treatment temperature and the grain detachment occurrence rate.
Figure 3:
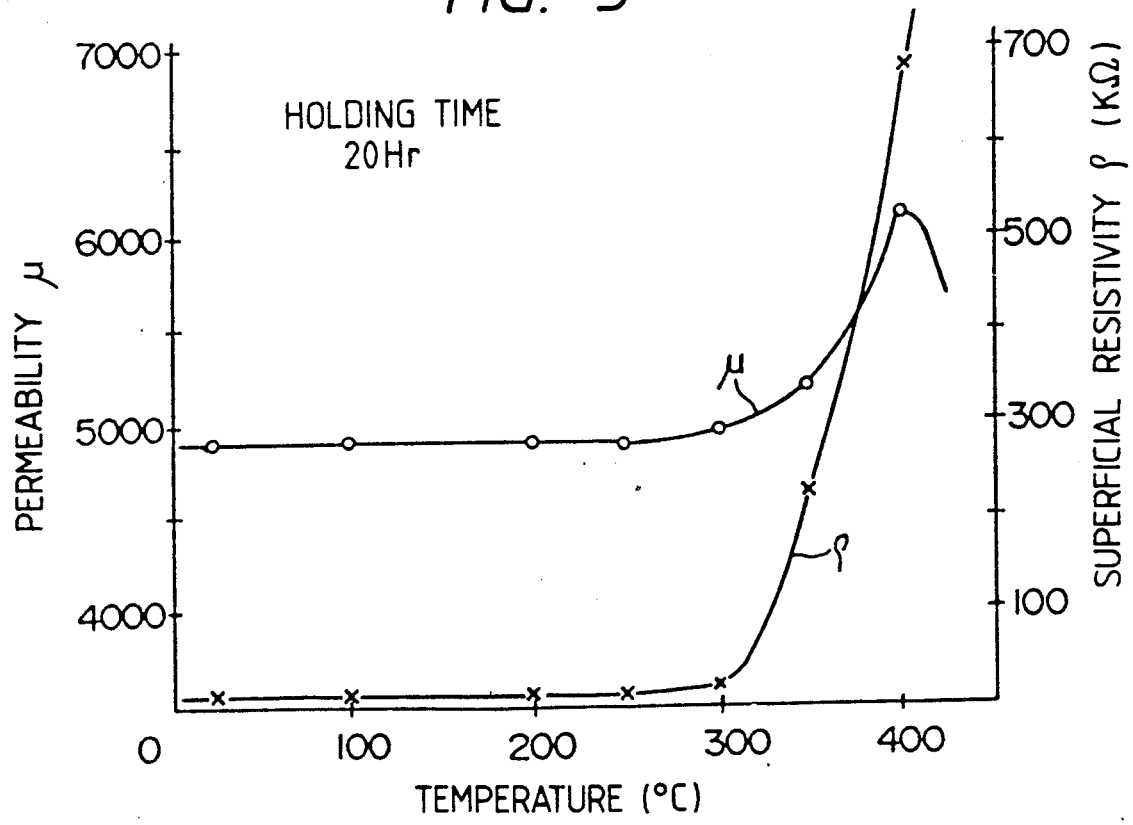
FIG. 3 is a graph showing the relationship between the slider heat treatment temperature and the permeability of the slider as well as the superficial resistivity.
Figure 4:
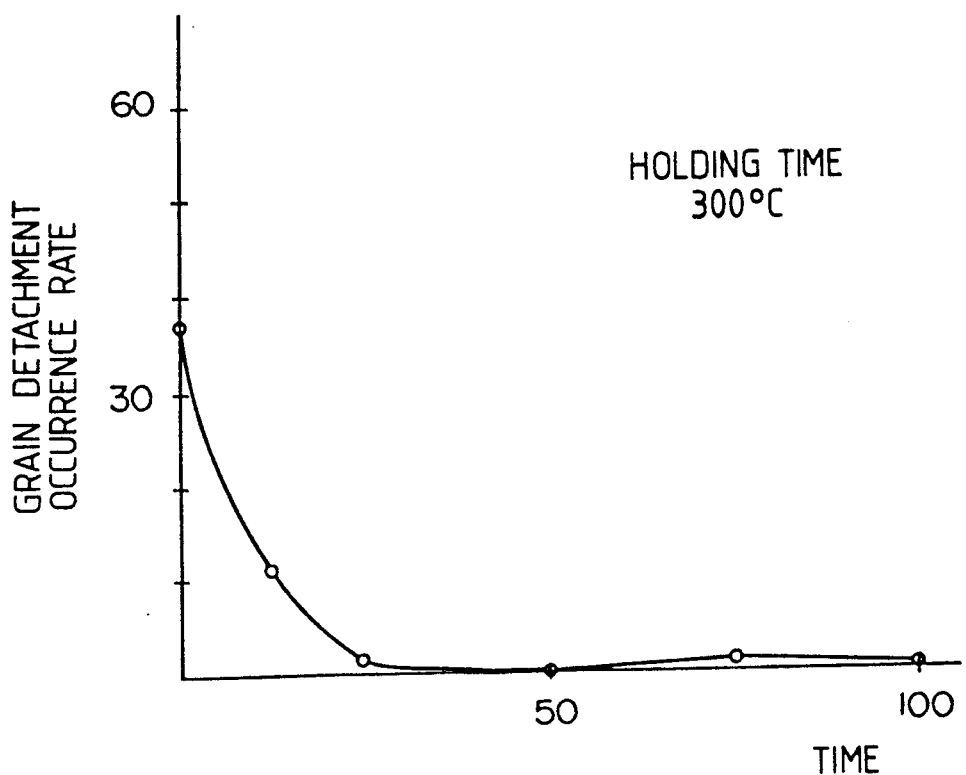
FIG. 4 is a graph showing the relationship between the slider heat treatment temperature and the grain detachment occurrence rate.
Figure 5:
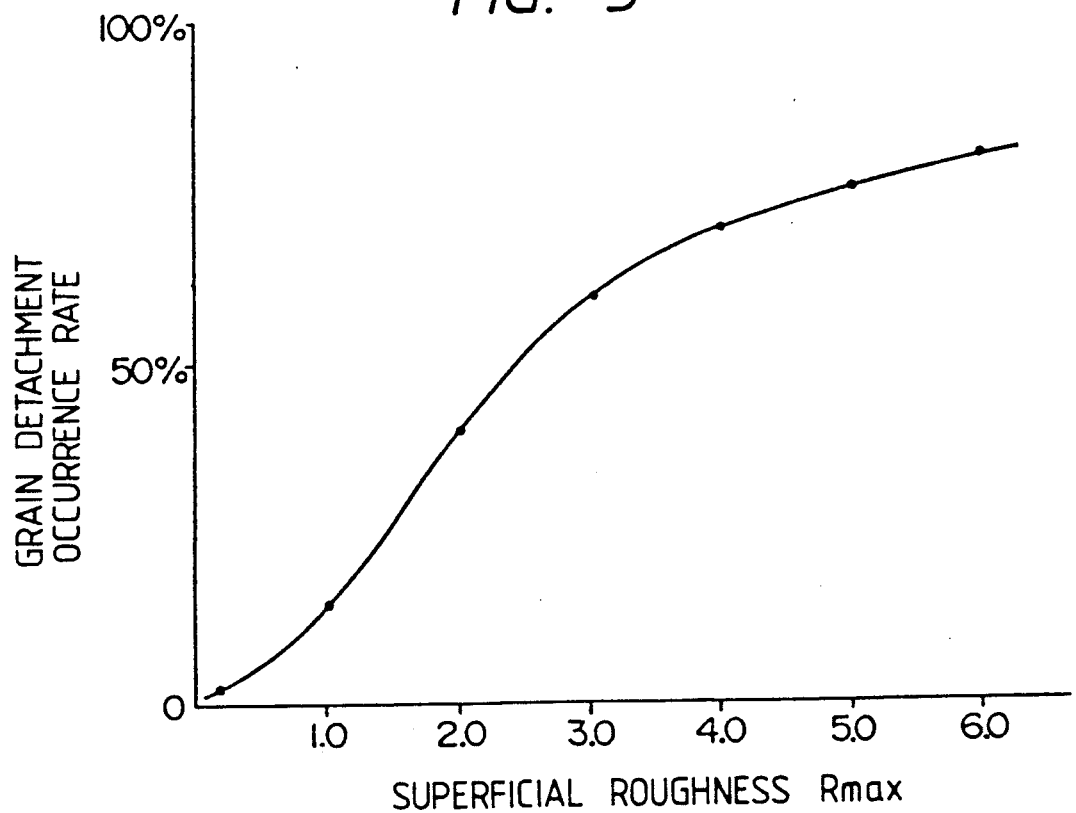
FIG. 5 is a graph showing the relationship between the superficial roughness of the surface of the slider and the grain detachment occurrence rate.

After that, the surface of the slider block 2 described above is lapped. Then, as indicated in FIG. 1G, the slider block 2 is divided into a plurality of slider 7 by slicing it successively with a predetermined interval along the joining plane with the head core 5. Thereafter the fabrication of the slider is terminated by subjecting the surfaces of the head core 5 and the slider 7 to a predetermined champhering processing.

In the fabrication process of the magnetic head as described above, after the formation of the negative pressure groove 6 described above and before the lapping of the surface of the slider block 2, the slider block 2 and the head core 3 were heat-treated in air for 20 hours at a temperature of 300° C. and the slider block 2 was cut by using a whetstone of granulometry of No. 2000 as a cutting tool and by setting the peripheral speed of this whetstone at 5000 m/min and the cutting speed by means of the whetstone at 1 mm/sec. Then an experiment on the resistance against high temperature and high humidity was performed, while leaving the slider 7 for 24 hours in an environment of temperature 8° C. and humidity 90° C. and it was found that the grain detachment occurrence rate is as low as 0.4%. It was verified that a remarkable grain detachment suppressing effect is obtained, comparing the grain detachment occurrence rate with that obtained by a similar experiment with a slider produced by the prior art fabrication method, which is 51.5%. It can be thought that this is due to the fact that the growth of microcracks produced at cutting the slider block 2 from the material block 1 is suppressed and further that the cutting surface is finished in minor surface, whose superficial roughness is below 1 μm. Rmax so that generation of microcracks is prevented.

According to JIS-R6001, it is prescribed that the average grain diameter of a whetstone of granulometry No. 1000 to 3000 is in a region between 18 and 4.7 μm. However, in practice, it can be thought that in general an average diameter of grains in a region between 20 and 2 μm is reasonable.

As explained above, according to this invention, since in the working process of a slider block the remaining stress in the surface portion of the slider block is eliminated by subjecting the slider block to a heat treatment in oxidizing medium for 5~50 hours at a temperature of 250°~350° C. and at the same time the growth of microcracks is suppressed by forming a dense oxide film on the surface portion of the slider block and further generation of the microcracks due to finishing of the cutting surface of the slider block is minor surface, whose superficial roughness is below 1 μm. Rmax, and to the cutting is suppressed by using a whetstone of granulometry of No. 1000~3000 as a cutting tool for the cutting processing of the slider block after the heat treatment and by setting of the slider block after the heat treatment and by setting the peripheral speed of the whetstone at 3000 to 10000 m/min, an excellent effect can be obtained that occurrence of the grain detachment due to the microcracks reduced significantly.

What is claimed is:

1. A method for fabricating a core slider for a magnetic head comprising the steps of:
   joining a core slider with a core block made of sintered ferrite;
   forming said core slider and said core block thus joined into a predetermined shape; and
   heat-treating said formed core slider and core block in an oxidizing medium for approximately in the range of 5-50 hours at a temperature approximately in the range of 250°-350° C.

2. A method for fabricating a slider for a magnetic head to decrease the occurrence of grain detachment, comprising the steps of:
   forming a slider block made of sintered ferrite into a predetermined shape;
   heat-treating said slider block in an oxidizing medium for 5-50 hours at a temperature of 250°-350° C.; and
   cutting said slider block into a plurality of sliders by using a whetstone of granulometry No. 1000-3000 as a cutting tool and by setting a peripheral speed of said whetstone at 3000-10000 m/min.

3. A method for fabricating a slider for a magnetic head to decrease the occurrence of grain detachment, comprising the steps of:
   cutting a slider block from a material block made of sintered ferrite;
   heat-treating said slider block in an oxidizing medium for 5-50 hours at a temperature of 250°-350° C.; and
   cutting said slider block into a plurality of sliders by using a whetstone of granulometry No. 1000-3000 as a cutting tool and by setting a peripheral speed of said whetstone at 3000-10000 m/min.

* * * * *